United States Patent [19]
Marek et al.

[11] 4,018,659
[45] Apr. 19, 1977

[54] METHOD FOR RADIATION POLYMERIZATION AND COPOLYMERIZATION OF ISOBUTYLENE BY A CATIONIC MECHANISM

[75] Inventors: Miroslav Marek; Ludek Toman; Jan Pecka, all of Prague, Czechoslovakia

[73] Assignee: Ceskoslovenska akademie ved, Prague, Czechoslovakia

[22] Filed: Apr. 3, 1975

[21] Appl. No.: 564,602

Related U.S. Application Data

[62] Division of Ser. No. 275,157, July 26, 1972, Pat. No. 3,897,322.

[30] Foreign Application Priority Data

July 29, 1971 Czechoslovakia ................. 5555/71

[52] U.S. Cl. ...................... 204/159.24; 252/431 R; 252/461; 260/429.3; 260/429.5; 260/439 R; 526/295; 526/332; 526/337; 526/339; 526/349
[51] Int. Cl.² ...................... C08D 1/00; C08F 1/16
[58] Field of Search ............. 204/159.24; 260/94.8, 260/94.9 B

[56] References Cited

UNITED STATES PATENTS

| | | | |
|---|---|---|---|
| 2,899,414 | 8/1959 | Mertes | 204/159.24 |
| 2,903,404 | 9/1959 | Oita et al. | 204/159.24 |
| 2,924,561 | 2/1960 | Schmerling | 204/159.24 |
| 3,462,403 | 8/1969 | Pendleton | 260/94.8 |
| 3,639,661 | 2/1972 | Marek et al. | 260/94.8 |
| 3,897,322 | 7/1975 | Marek et al. | 204/159.24 |

*Primary Examiner*—Richard B. Turer

[57] ABSTRACT

Method for the cationic polymerization of at least one olefinic monomer and more particularly the homopolymerization of a mono-olefinic monomer such as isobutylene and the copolymerization thereof with a di-olefinic monomer (diene) such as butadiene and optionally another mono-olefinic monomer in the presence of, as initiator of a halide of tetravalent vanadium, titanium and zirconium, an activator and under the influence of visible ultraviolet or infra-red light.

10 Claims, No Drawings

METHOD FOR RADIATION POLYMERIZATION AND COPOLYMERIZATION OF ISOBUTYLENE BY A CATIONIC MECHANISM

RELATED APPLICATION

This application is a division of Ser. No. 275,157 filed on July 26, 1972, now U.S. Pat. No. 3,897,322, dated July 29, 1975.

BACKGROUND OF THE INVENTION

This invention relates to a method for the polymerization and copolymerization of olefinic monomers. More particularly this invention relates to an improved method for the polymerization of isobutylene and its copolymerization with butadiene.

High molecular weight polyisobutylene and copolymers of isobutylene with isoprene are currently being produced at low temperatures, such as −80° to −100° C. The limiting factor in the low temperature method for producing butyl rubber is the choice of an appropriate diene comonomer. The industrial methods now in use are all based on the copolymerization of isobutylene with isoprene. This is the case despite the fact that butadiene is a cheaper and more readily available diene monomer than isoprene. The isoprene is used rather than the butadiene because of its more acceptable copolymerization reactivity ratio with respect to the isobutylene. The reactivity ratio of isoprene to isobutylene is virtually independent of temperature, while that of butadiene decreases with decreasing temperature. Butyl rubber having the required amount of double bonds could not heretofore be prepared by the copolymerization of isobutylene with butadiene at temperatures of about −100° C. At higher temperatures, products having low molecular weights only were obtained, such products being entirely unsuitable for use in the production of vulcanized articles.

There is disclosed in Czechoslovak Pat. Nos. PV 2712–70 and PV 2792–70, combined in U.S. patent application Ser. No. 133,545 abandoned and refiled as Ser. No. 184,637 filed Sept. 28, 1971, that the polymerization of monomers having olefinic double bonds in their molecules can be carried out using a cationic system and accelerated by light, in the presence of halides of tetravalent titanium, vanadium and zirconium.

In accordance with the invention, it has now been found that the polymerization carried out in the presence of the aforesaid halides and under the influence of light (visible ultraviolet or infra red) takes place more readily when it is conducted in the presence of certain activators, for instance, metal oxides, hydroxides and alkoxides. The activators may be present in the polymerization medium in the form of their solutions or as fine suspensions. In the presence of these activators, the polymerization reaction proceeds not only more readily but also more rapidly than heretofore possible.

SUMMARY OF THE INVENTION

It is an object of this invention to provide an improved method for the cationic homopolymerization of olefinic monomers.

It is another object of this invention to provide a method for the cationic copolymerization of at least one mono-olefinic monomer with a diolefinic monomer.

It is yet another object of this invention to avoid the disadvantages associated with the prior art methods and to provide an economically and technically simple and feasible method for the cationic polymerization of at least one olefinic monomer.

Broadly speaking, the invention comprises the cationic homo- and copolymerization of two or more olefinic monomers initiated by a catalyst comprising the halides of tetravalent metals, such as vanadium, tatanium and zirconium, in the presence of an activator having the formula:

wherein M is an alkali or alkaline earth metal, Cu, Zn, B, Al, Si, Ti, Zr, V, Cr, Mo, W, U, Fe, Co, or Ni and A is an electro-negative element or —O—, —OH, —OR, wherein R is alkyl or aryl, $x$ is 1 or 2 and $y$ is an integer of 1 to 5. Products of the reaction of hydroxy and/or alkoxy compounds of Al or Mg with $BF_3$, the aluminates, silicates, and carbonates of univalent and bivalent metals, activated carbon and finely dispersed metallic Zn, Cu, Al and Fe are all also suitable for use herein. The polymerization is carried out at temperatures of from about 0° to −140° C, using a molar ratio of catalyst to activator in the range of $10^3$ to $10^{-3}$. The polymerization rate may be further controlled by careful metered introduction of the catalyst and activator and/or by interrupting or intensifying the irradiation.

Polymerization reactions catalyzed by Friedel-Crafts halides are known to require a so-called co-catalyst for initiating the reaction. The co-catalyst is usually a compound of an electron donating character which is able to provide the monomer or monomers with protons or carbonium cations. The most conventional co-catalysts used are water, alcohols, ethers, carboxylic acids and the alkyl halides. However, the oxygen containing compounds of alkali metals and alkaline earth metals have not heretofore been known to act as co-catalysts in the instant type of reaction as in the instant invention, the application of these compounds is for an entirely different type of catalysis, the compounds are identified hereinafter as activators. Certain of the activators also act as drying agents, for example KOH, and NaOH, and the polymerization may be carried out in their presence without the thorough preliminary drying of the polymerization mixture. The polymerization velocity will depend not only upon the concentration of catalyst and intensity of the light used, but also it will depend, to a considerable extent on the concentration of activators present. When water soluble activators are employed, the polymerization velocity is strongly influenced by the molar ratio of the activator and the halide catalyst. The preferred molar ratio ranges from about 2 to 0.01. At molar ratios of above 10, the rate of the polymerization is extremely unsatisfactory. This ratio can be varied over a broader range, if heterogeneous activators are employed and as such will depend on the grain size of the suspension as used, i.e., on the active surface are. The molar ratio of the heterogeneous activator and catalyst may then vary from 0.1 to $10^3$.

DETAILED DESCRIPTION

As already noted, the activators utilized in carrying out the invention are compounds of the formula:

wherein M is an alkali or alkaline earth metal, copper, zinc, boron, aluminum, silicon, titanium, zirconium, vanadium, chromium, molybdenum, tungsten, uranium, iron, cobalt, or nickel, A is an electronegative element or —O—, —OH, or —OR, wherein R is alkyl or aryl, and $x$ and $y$ are integers of 1 to 2 and 1 to 5 respectively. The activators may also be reaction products of hydroxy and/or alkoxy compounds of aluminum or magnesium with boron trifluoride, there being included among the hydroxy and alkoxy compounds, the partially hydrolyzed aluminum and magnesium alkoxides. The latter constitute a transition between the boundary types, and namely between the hydroxides and alkoxides of the indicated metals. There are also operable compounds of the formulae: $Al(OH)_2X$, $Al(OH)X_2$, $Al(OR)_2X$, $AL(OR)X_2$, $Mg(OR)X$, and $Mg(OH)X$, wherein X is an electronegative element or group, such as halogen, —O—, —OH and the like and such as where X is —OR, R being alkyl or aryl. Another class of operable activators are the aluminates, silicates and carbonates of univalent and bivalent metals, activated carbon and finely dispersed metallic zinc, copper aluminum and iron.

In carrying out the instant process, the catalyst and activator can be added to the reaction mixture in any order, i.e., in an arbitrary order in increments or as a previously blended mixture. The activator having a drying effect is advantageously added as the first component to the polymerization mixture thereby being operative to remove traces of moisture from the system. The polymerization velocity can be safely controlled by careful metering the catalyst and activator and by regulating the action of the light on the reaction mixture. Overheating can be avoided by removal of any excess heat. This method for the controlled polymerization and copolymerization of olefinic monomers may be advantageously and successfully carried out for the polymerization of monomers without the need to resort to any auxiliary solvent. The molecular weights of the polymers and copolymers can be varied over a broad range at the given temperature by the proper combination of the catalyst, activator and the action of light. The polymers and, especially, the high molecular weight copolymers of isobutylene with butadiene can be obtained with an appropriate combination even at relatively high temperatures. Butyl rubber of the required molecular weight and concentration of double bonds can be prepared by the aforesaid method at temperatures of about −40° to −30° C.

Higher temperatures may also be employed and are advantageous for reasons of reaction rate etc. The polymerization which may be carried out without the need to employ an auxiliary solvent, results in high conversions (70 to 80%), the effective drying of the monomers with one component of the catalyst (KOH, NaOH, etc.), and the possibility to use the more accessible and cheaper co-monomers (i.e. butadiene) thereby providing a new and economical means for the production of polyisobutylene and butyl rubber.

In addition to the homopolymerization of mono-olefins such as isobutylene and the copolymerization thereof with a diolefin such as butadiene, the following olefinic monomers may also be copolymerized with isobutylene or therpolymerized with the aforesaid copolymers of isobutylene (branched or straight chain) and butadiene: styrene, -methylstyrene, Cl-6 alkyl vinylethers, 2-chloro-butadiene-1,3, 2-methyl-butadiene-1,3, dimethallyl, 2,3-dimethyl-butadiene-1,3,piperylene, cyclohexadiene, cyclopentadiene, alkoxybutadienes and the like.

Where desired, the solution polymerization can be carried out in aliphatic (i.e. heptane) aromatic (i.e. toluene) or halogenated (i.e. carbon tetrachloride) solvents.

The influence of light and various of the activating compounds on vanadium (IV) chloride catalyst can be seen from the following Table:

TABLE 1

| | influence of light and activating compounds upon vanadium (IV) chloride | | | | | |
|---|---|---|---|---|---|---|
| Catalyst | Concn. of $VCl_4$ (mol/g) | Monomer % of isobutylene | Irradiation | Time(polym. period) | Conversion % | Mol.Wt. |
| $VCl_4$ | $1.87 \times 10^{-5}$ | 100 | 60 min 200 W elec. lamp | 60 min. | 45 | 230 000 |
| $VCl_4$ + BaO | $4.86 \times 10^{-6}$ | 100 | 5 min 100 W elec. lamp | 30 min | 78 | 130 000 |
| $VCl_4$ + KOH | $5.00 \times 10^{-6}$ | 100 | 5 min 100 W elec. lamp | 30 min | 70 | 137 000 |
| $VCl_4$ + Li tertbutoxide | $5.15 \times 10^{-6}$ | 100 | 5 min 100 W elec. lamp | 30 min | 62 | 196 000 |

Polymerization carried out at a temperature of −40° C

The following examples are given by way of illustration only and are in no-wise to be construed as limitative of the scope thereof. The examples of the polymerization reactions disclosed were each carried out in a glass reactor equipped with a magnetic stirrer under anhydrous conditions in an inert atmosphere, for example of oxygen-free argon. The application of the ultraviolet light was carried out using a quartz apparatus. The periods of irradiation set out in the examples represent a sum of the irradiation periods for the entire reaction, which periods were controlled so as to provide the isothermal course of the reaction. The molecular weights of the resultant polymers were determined by viscometry, in n-heptane and carbon tetrachloride at 20° C and were calculated by means of the Flory relationship:

for n-heptane $[\eta] = 3.6 \times 10^{-4} M^{0.64}$
for carbon tetrachloride $[\eta] = 4.52 \times 10^{-4} M^{0.64}$

EXAMPLE 1

The polymerization of 25 g of isobutylene was carried out without an auxiliary solvent at a temperature of −40° C. Vanadium (IV) chloride and lithium tert-butoxide were used as the catalyst components in the following amounts: $8.79 \times 10^{-5}$ mol and $2 \times 10^{-5}$ mol, respectively. After introducing the catalyst components, the reaction mixture was irradiated with a 100 Watt electric lamp for 5 minutes. The polymerization was stopped after 30 minutes by the addition of a small amount of acetone. A conversion of 62% was thereby obtained. The molecular weight of the polymer was 196,000.

EXAMPLE 2

The polymerization of 23 g of isobutylene was carried out without an auxiliary solvent at a temperature of −40° C. Vanadium(IV) chloride ($8.79 \times 10^{-5}$ mol) and barium oxide ($2 \times 10^{-3}$ mol as a fine suspension in n-heptane) were used as the catalyst components. After addition of the catalyst components, the reaction mixture was irradiated with a 100 Watt electric lamp for 5 minutes. The polymerization was stopped by the addition of ethanol after 30 minutes. The conversion amounted to 78% and molecular weight of the polymer was 130,000.

EXAMPLE 3

The polymerization of 25 g of isobutylene was carried out without an auxiliary solvent at a temperature of −40° C. After the catalyst components had been introduced, the reaction mixture was irradiated for 5 minutes with a 100 Watt electric lamp. The polymerization was stopped after 30 minutes by the addition of ethanol. The following catalyst components were used:

a. Vanadium(IV) chloride ($8.79 \times 10^{-5}$ mol) and potassium hydroxide ($1 \times 10^{-3}$ mol) which potassium hydroxide was introduced in the form of a fine suspension in n-heptane. The conversion was 72% and the molecular weight of the polymer was 137,640.

b. Vanadium(IV) chloride ($8.79 \times 10^{-5}$ mol) and sodium hydroxide ($2 \times 10^{-3}$ mol), the latter being introduced as a fine suspension in n-heptane. The conversion was 72% and the molecular weight of the polymer was 140,000.

EXAMPLE 4

The polymerization of 25 g of isobutylene was carried out without an auxiliary solvent at a temperature of −40° C. Titanium(IV) chloride ($1.42 \times 10^{-4}$ mol) and sodium hydroxide ($2.2 \times 10^{-3}$ mol) were used as co-catalysts. The sodium hydroxide was introduced as a fine suspension in n-heptane. After the catalyst components had been introduced, the reaction mixture was irradiated with a 200 Watt electric lamp for 2 minutes. The polymerization was terminated after 30 minutes by the addition of ethanol. The conversion amounted to 50% and the polymer had a molecular weight of 130,000.

EXAMPLE 5

The polymerization of 25 g of isobutylene was carried out without an auxiliary solvent at a temperature of −40° C. Titanium(IV) chloride ($1.42 \times 10^{-4}$ mol) and aluminum oxide ($3.2 \times 10^{-3}$ mol) were used as co-catalysts. The aluminium oxide was introduced as a fine suspension in n-heptane. The reaction mixture was irradiated for 5 minutes with a 100 Watt electric lamp following introduction of the catalyst components. The polymerization was stopped after 30 minutes by the addition of ethanol. There was realized a conversion of 65%. The polymer had a molecular weight of 144,000.

EXAMPLE 6

The polymerization of 24 g of isobutylene was carried out without an auxiliary solvent at a temperature of −40° C. Titanium(IV) chloride ($1.42 \times 10^{-4}$ mol) and vanadium(IV) oxide ($1.2 \times 10^{-3}$ mol) as a fine suspension in heptane were used as the co-catalyst components. After the two components had been introduced, the reaction mixture was irradiated for 1 hour with a 60 Watt electric lamp. The polymerization was stopped by addition of ethanol. The conversion amounted to 10.4% and the polymer had a molecular weight of 255,500.

EXAMPLE 7

The polymerization of 25 g of isobutylene was carried out without an auxiliary solvent at a temperature of −40° C. Titanium(IV) bromide ($1.5 \times 10^{-4}$ mol) and magnesium oxide ($2.4 \times 10^{-3}$ mol) were used as co-catalyst components. Magnesium oxide was introduced in the form of its suspension in heptane. After introduction of the two catalyst components, the reaction mixture was irradiated for 5 minutes with a 500 Watt electric lamp. The polymerization was interrupted after 20 minutes by the addition of ethanol. The conversion amounted to 51.3% and the molecular weight of the polymer was 150,000.

EXAMPLE 8

The polymerization of 25 g of isobutylene was carried out without an auxiliary solvent at a temperature of −100° C. Titanium(IV) iodide ($1.5 \times 10^{-4}$ mol) and calcium oxide ($1.1 \times 10^{-3}$ mol) were used as co-catalyst components. The calcium oxide was introduced as its suspension in heptane. After the two catalyst components had been introduced, the reaction mixture was irradiated with a 200 Watt electric lamp for 10 minutes. The polymerization was stopped at 120 minutes by the addition of ethanol. The conversion amounted to 6% and the polymer had a molecular weight of 1,550,000.

EXAMPLE 9

The polymerization of isobutylene was carried out in heptane (concentration 50% (w/w)) at a temperature of −50° C. Vanadium(IV) chloride ($1.8 \times 10^{-4}$ mol) and ferric oxide ($1.1 \times 10^{-4}$ mol) were used as co-catalyst components. The ferric oxide was introduced in the form of a heptane suspension. After introducing the two catalyst components into 30 g of the heptane solution containing the isobutylene, the reaction mixture was irradiated with a 200 Watt mercury discharge lamp for 35 minutes. The polymerization was stopped after 30 minutes by the addition of ethanol. The conversion amounted to 70% and the polymer had a molecular weight 250,000.

EXAMPLE 10

The polymerization of isobutylene was carried out in a toluene solution (concentration 50% (w/w)) at a temperature of −60° C. Vanadium(IV) chloride ($1.5 \times 10^{-4}$ mol) and calcium hydroxide ($1.8 \times 10^{-3}$ mol) were used as co-catalyst components. The calcium hydroxide was introduced as a suspension in heptane. After introducing the two catalyst components into 30 g of isobutylene solution, the reaction mixture was irradiated for 10 minutes with a 200 Watt electric lamp. The polymerization was terminated by the addition of ethanol at a conversion of 69% and a molecular weight of the polymer of 145,000.

EXAMPLE 11

The polymerization of isobutylene was carried out without a solvent at a temperature of $-30°$ C. $VCl_4$ ($3 \times 10^{-5}$ mol) and a heptane suspension of $MoO_3$ ($2.5 \times 10^{-3}$ mol) were added to 23 g of isobutylene. The reaction mixture was irradiated with a 500 Watt electric lamp for 2 minutes. The polymerization was stopped after 30 minutes. 15 g of the polymer were obtained having a molecular weight 175,000.

EXAMPLE 12

$VCl_4$ ($5 \times 10^{-5}$ mol) and $3 \times 10^{-4}$ mol of CuO, in a heptane suspension were added to 20 g of isobutylene at $-25°$ C. After irradiation with a 500 Watt electric lamp for 2 minutes polyisobutylene was obtained having a molecular weight 100,000 at a conversion of 40%.

EXAMPLE 13

The copolymerization of 20 g of isobutylene with 4 g of butadiene was carried out at a temperature of $-40°$ C. $VCl_4$ ($6 \times 6 \times^5$ mol) and $MoO_3$ ($2.5 \times 10^{-3}$ mol) were added to the mixture of monomers which was then irradiated with a 500 Watt electric lamp for 5 minutes. The copolymerization was stopped after 30 minutes by the addition of ethanol. The conversion amounted to 30% and the molecular weight of the copolymer was 325,000.

EXAMPLE 14

The copolymerization of isobutylene and butadiene was carried out at a temperature of $-40°$ C. $VCl_4$ ($8 \times 10^{-5}$ mol) and a KOH suspension in heptane ($5 \times 10^{-3}$ mol) were added to 25 g of the mixture of monomers which contained 20% w/w of butadiene. The reaction mixture was irradiated with a 500 Watt electric lamp for 1 minute and the polymerization stopped after 45 minutes. The conversion amounted to 55%. The copolymer contained 70% of insoluble gels.

EXAMPLE 15

The copolymerization of 20 g of isobutylene and 1 g of isoprene was carried out in accordance with the disclosure of EXAMPLE 14. The copolymer formed had a molecular weight of 105,000 at a conversion of 30%.

EXAMPLE 16

The polymerization of isobutylene was carried out without an auxiliary solvent. Into 25 g of isobutylene there were introduced:

a. Vanadium(IV) chloride ($8.79 \times 10^{-5}$ mol) and aluminum sec-butoxide ($6 \times 10^{-6}$ mol). The polymerization was carried out at a temperature of $-40°$ C and by means of irradiation with a 100 Watt electric lamp for 5 minutes. The polymerization was stopped after 25 minutes by the addition of ethanol at a conversion of 70% and a molecular weight of 220,000.

v. Vanadium(IV) chloride ($5.86 \times 10^{-5}$ mol) and $8 \times 10^{-6}$ mol of aluminum sec-butoxide saturated with boron trifluoride. The polymerization was carried out at a temperature of $-40°$ C by means of irradiation with a 100 Watt electric lamp for 5 minutes. The polymerization was stopped after 20 minutes by the addition of ethanol at a conversion of 69% and a molecular weight of 250,000.

EXAMPLE 17

The terpolymerization of 30 g of isobutylene, 4.4 g of butadiene and 1 g of styrene was carried out at a temperature of $-40°$ C. Vanadium(IV) chloride ($9.8 \times 10^{-5}$ mol) and a heptane suspension of sodium ethoxide ($5.1 \times 10^{-3}$ mol) were added to the mixture of monomers. The sodium ethoxide was prepared by the reaction of ethanol and metallic sodium, followed by heating to 200° C in vacuo for 2 hours and a final heating at this temperature in a stream of hydrogen for 1 hour. After the catalyst components had been introduced, the reaction mixture was irradiated with a 100 Watt electric lamp for 5 minutes. The reaction was stopped after 60 minutes by the addition of 10 cc. of ethanol at a conversion of 52%. The molecular weight of the product was 152,000 and the concentration of the double bonds 1.72%.

EXAMPLE 18

The copolymerization of 22 g of isobutylene and 1.5 g of 2,3-dimethylbutadiene-1,3 was carried out without an auxiliary solvent. Vanadium(IV) chloride ($8.79 \times 10^{-5}$ mol) and potassium phenoxide ($6 \times 10^{-3}$ mol), as a suspension in heptane, were introduced into the mixture of monomers. The reaction mixture was then irradiated with a 100 Watt mercury discharge lamp for 10 minutes and the reaction was stopped after 60 minutes by the addition of 10 cc. of ethanol. The resulting copolymer had a molecular weight of 210,000 and contained 0.95% of double bonds at a conversion of 50.8%.

EXAMPLE 19

The copolymerization of 25 g of isobutylene and 2.2 g of chloroprene was carried out without an auxiliary solvent at a temperature of $-40°$ C. Vanadium(IV) chloride ($1 \times 10^{-4}$ mol) and lithium tertbutoxide ($5 \times 10^{-6}$ mol) were introduced into the mixture of monomers. The reaction mixture was then irradiated with a 100 Watt electric lamp for 5 minutes. The reaction was stopped after 60 minutes by the addition of 10 cc. of ethanol at a conversion of 49%. The polymer had a molecular weight of 170,000. The product contained 1.17% of chlorine.

EXAMPLE 20

The copolymerization of isobutylvinylether with isobutylene was carried out at a temperature of $-50°$ C. Vanadium(IV) chloride ($1 \times 10^{-4}$ mol) and barium hydroxide ($5 \times 10^{-3}$ mol) were added to the monomer mixture which consisted of 30 g of isobutylene and 2 g of isobutylvinylether. The reaction mixture was then irradiated with a 100 Watt electric lamp for 5 minutes. The reaction was stopped by the addition of 10 cc. of ethanol after 50 minutes. The conversion amounted to 38% and the intrinsic viscosity of the product amounted to 1.3 (heptane, 20° C.

EXAMPLE 21

The polymerization of a 10% solution of isobutylene in hexane was carried out at a temperature of $-30°$ C at continuous stirring. The catalyst was used as a 0.5% suspension in hexane and was prepared by saturation of a 10% suspension of aluminum hydroxide in hexane with boron trifluoride at 10° C. The free $BF_3$ was removed by distillation of about a half of the hexane, and addition of 0.5 mol of $TiCl_4$ per mole of the aluminum compound. The aluminum hydroxide used was obtained by precipitation of aluminum sulfate with ammonia or alkaline aluminate with carbon dioxide in an aqueous medium, centrifuged, washed with water and dehydrated by butanol and hexane. By saturation of the hydroxide with $BF_3$, a green complex was formed which turned yellow after the addition of $TiCl_4$ thereto. After the catalyst had been added, the reaction mixture was irradiated with a 200 Watt electric lamp for 30 minutes. The polymerization was stopped by the addition of acetone after 30 minutes at a conversion of 99% and molecular weight of 700,000.

EXAMPLE 22

The polymerization of a 10% solution of isobutylene in hexane was carried out at 0° C with continuous stirring of the solution and by means of 0.5% of a catalyst suspension in hexane. The catalyst was prepared from a 10% solution of a partially hydrolyzed aluminum sec butoxide in hexane, which was saturated with boron trifluoride at 10° C. After half of the volume of hexane was distilled off and 0.5 mol of $TiCl_4$ per 1 mole of aluminum alkoxide was added, the original green color of the suspension turned yellow. The suspension obtained was used as a catalyst. The hydrolysis of an about 10% solution of aluminum sec butoxide in sec butanol was carried out at −50° C using a calculated amount of water (1 mol of water per 2 mol of alkoxide) which was added as a solution in alcohol under continuous stirring within a period of 1 hour. After the hydrolysis, the alcohol was distilled off from the reaction mixture in vacuo and the product thusly obtained dissolved in hexane and saturated with $BF_3$. After introduction of the catalyst, the polymerization mixture was irradiated with a 200 Watt electric lamp for 30 minutes. The reaction was stopped after 1 hour by the addition of acetone at a conversion of 98% and a molecular weight of 180,000.

EXAMPLE 23

The polymerization of a 10% solution of isobutylene in hexane was carried out at 0° C under continuous stirring and with 0.5% of a catalyst suspended in hexane. The catalyst was prepared from dihydroxyfluoroaluminum which was washed with water, dehydrated with absolute alcohol and hexane, suspended in hexane and saturated with $BF_3$ at 10° C. The suspension was used after the addition of 0.5 mol of $TiCl_4$ per mol of the aluminum compound. After addition of the catalyst, the reaction mixture was irradiated with a 200 Watt electric lamp for 30 minutes. The polymerization was stopped after 1 hour by the addition of acetone at a conversion of 58% and a molecular weight of 150,000.

EXAMPLE 24

The polymerization of isobutylene was carried out with the catalyst prepared as described in Example 21. Magnesium hydroxide was used in place of the aluminum hydroxide, which was obtained from magnesium sulfate or another magnesium salt by precipitation with sodium hydroxide in an aqueous medium and then treated similarly as the aluminum hydroxide in EXAMPLE 21. After the catalyst had been introduced into the polymerization mixture, it was irradiated with a 200 Watt electric lamp under continuous stirring for 30 minutes. The polymerization was stopped by the addition of acetone after 1 hour at a conversion of 97% and a molecular weight of 160,000.

EXAMPLE 25

The polymerization of a 10% (w/w) solution of isobutylene in hexane was carried out at 0° C under continuous stirring with 0.5% (w/w) of the catalyst which was suspended in hexane. The catalyst was prepared by saturation of dipropoxychloroaluminum with $BF_3$ in a hexane solution. the free $BF_3$ was removed by distilling off half of the hexane. Vanadium(IV) chloride was added in a molar ratio to the aluminum in the alkoxychloroaluminum equal to 0.5. After the catalyst had been introduced, the polymerization mixture was irradiated with a 200 Watt electric lamp for 30 minutes. The reaction was stopped after 1 hour by the addition of acetone at a conversion of 95% and a molecular weight of 120,000.

EXAMPLE 26

The terpolymerization of 25 g of isobutylene, 4.4 g of butadiene and 1.2 g of styrene was carried out at −60° C without an auxiliary solvent. Vanadium(IV) chloride ($8 \times 10^{-5}$ mol) and 0.01 g of an activator in the form of a hexane suspension were used as the co-catalyst components. The activator was prepared by introducing $BF_3$ into a 10% solution of aluminum tertbutoxide in hexane at a temperature of 10° C to maximal saturation. The greenish, voluminous precipitate thereby obtained was treated with 1 mol $TiBr_4$ per 1 mol of alkoxide and the resulting suspension used as activator. After introducing the vanadium(IV) chloride and the activator into the monomer mixture, it was irradiated with a 200 Watt electric lamp for 4 minutes. The reaction was stopped after 30 minutes by the addition of ethanol at a conversion of 59% and a molecular weight of 210,000. The terpolymer contained 1.4% of double bonds.

EXAMPLE 27

The terpolymerization of 25 g of isobutylene, 0.3 g of isoprene and 3 g of butadiene was carried out without an auxilliary solvent at −40° C. Vanadium(IV) chloride ($1 \times 10^{-4}$ mol) and 0.01 g of a hexane suspension of an activator were introduced into the reaction mixture. The activator was prepared by mixing chloroethane solutions of aluminum sec butoxide and $AlCl_3$ in a molar ratio of 1:3. The mixture was then diluted with dry hexane, the precipitate formed decanted with dry hexane, treated with $TiI_4$ in a molar ratio of 1:1 to aluminum sec butoxide and then used as its suspension. After the catalyst and activator had been introduced, the reaction mixture was irradiated with a 200 Watt electric lamp for 5 minutes. The reaction was stopped by the addition of ethanol at a conversion of 69% and a molecular weight of 290,000. The terpolymer thus obtained contained 2.1% of double bonds.

EXAMPLE 28

The polymerization of 30 g of a $C_4$-fraction was carried out at a temperature of −78° C. The $C_4$-fraction was previously twice washed with 5% sulfuric acid and dried over potassium hydroxide and consisted of: 1,3-butadiene 730 ppm, isobutylene 45.41% (w/w), butene-1 20.1% w/w, trans-butene-2 13.2% w/w, cis-butene-2 8.8% w/w, isobutane 1.8% w/w and n-butane 10.6% w-w. Vanadium(IV) chloride ($1.5 \times 10^{-4}$ mol) and 0.01 g of the activator were used as the catalyst co-components. The activator was prepared by the addition of a resublimed $AlCl_3$ in a 10% hexane solution of aluminum sec butoxide in a molar ratio of 3:1. The suspension was thoroughly blended in a ball mill and then employed. After introducing the catalyst and activator, the $C_4$-fraction was irradiated with a 200 Watt electric lamp for 5 minutes. The reaction was terminated after 60 minutes by the addition of ethanol at a conversion of 98% (based on isobutylene) and a molecular weight of 210,000.

EXAMPLE 29

The polymerization of 30 g of isobutylene was carried out without an auxiliary solvent at −50° C. The following catalyst components were used:
  a. Vanadium(IV) bromide ($1 \times 10^{-4}$ mol) and aluminum hydroxide in a heptane suspension (prepared as described in EXAMPLE 21, $6 \times 10^{-5}$ mol). After introducing the catalyst components, the reaction mixture was irradiated with a 200 Watt electric lamp for 3 minutes. The reaction was terminated after 30 minutes by the addition of ethanol at a conversion of 76% and a molecular weight of 250,000.
  b. Vanadium(IV) iodide ($1.5 \times 10^{-4}$ mol) and magnesium hydroxide (prepared as in EXAMPLE 24) in a heptane suspension ($5 \times 10^{-5}$ mol). After introducing the catalyst and activator, the reaction mixture was irradiated with a 200 Watt electric lamp for 2 minutes. The reaction was stopped after 30 minutes by the addition of ethanol at a conversion of 72% and a molecular weight of 279,000.

EXAMPLE 30

The polymerization of 25 g of isobutylene was carried out without an auxiliary solvent at −40° C in the presence as catalyst of vanadium(IV) chloride. The $VCl_4$ ($9 \times 10^{-5}$ mol) was added to the isobutylene under continuous stirring and, after addition of an activator, the reaction mixture was irradiated with a 200 watt electric lamp for 2 minutes. The reaction was terminated after 30 minutes by the addition of ethanol. The following activators were used:
  a. 0.8 g of powdered copper in heptane suspension;
  b. 0.5 g of powdered pyrophoric iron in heptane suspension;
  c. 0.55 g of powdered zinc in heptane suspension;
  d. 0.25 g of powdered aluminum in heptane suspension. A rubber-like polymer was formed in all of the cases having a molecular weight of about 180,000. The conversion amounted to about 70%.

EXAMPLE 31

The polymerization of 30 g of isobutylene was carried out without an auxiliary solvent and with vanadium(IV) chloride as the catalyst at −50° C. the $VCl_4$ ($5.8 \times 10^{-5}$ mol) was added to the isobutylene under continuous stirring. Following the addition of an activator, the reaction mixture was irradiated with a 200 Watt electric lamp for 3 minutes. The reaction was stopped after 30 minutes by the addition of ethanol. The following activators were used:
  a. 0.25 g of magnesium aluminate in heptane suspension;
  b. 0.30 g of magnesium silicate in heptane solution;
  c. 0.20 g of amorphous powdered silicon dioxide in heptane suspension.

A rubber like polymer having a molecular weight of about 290,000 was obtained in all cases at a conversion of 79%.

EXAMPLE 32

The polymerization of 26 g of isobutylene was carried out without an auxiliary solvent at −40° C. Vanadium(IV) chloride ($8.9 \times 10^{-5}$ mol) was used as the catalyst and n-butyl orthoborate $6 \times 10^{-6}$ mol) as the activator. After both of the components had been introduced, the reaction mixture was irradiated with a 200 Watt electric lamp for 2 minutes. The polymerization was terminated after 30 minutes by the addition of ethanol at a conversion of 78% and a molecular weight of the polymer of 280,000.

EXAMPLE 33

The polymerization of 27 g of isobutylene was carried out without an auxiliary solvent at a temperature of −30° C. Active carbon (0.1 g) and $7.2 \times 10^{-5}$ mol of vanadium(IV) chloride were added into the continuously agitated isobutylene in a stream of nitrogen. The reaction mixture was irradiated with a 200 Watt electric lamp for 2 minutes and the reaction stopped by the addition of ethanol at a conversion of 65% and a molecular weight of 150,000.

EXAMPLE 34

The copolymerization of isobutylvinylether with 2,3-dimethylbutadiene-1,3 was carried out without an auxiliary solvent at a temperature of −40° C. 2,3-dimethylbutadiene-1,3 (5g) was added to 25 g of isobutylvinylether, the mixture then cooled to the polymerization temperature and $1.1 \times 10^{-4}$ mol of titanium(IV) iodide and $3.2 \times 10^{-3}$ mol of aluminum oxide in heptane suspension were introduced. The reaction mixture was irradiated with a 200 Watt electric infrared lamp for 2 minutes. The polymerization was stopped by the addition of ethanol after 30 minutes at a conversion of 5.8% and an intrinsic viscosity of the copolymer of 1.43 ($CCl_4$, 20° C).

EXAMPLE 35

Isobutylene (25 g) was polymerized without an auxiliary solvent at −50° C using $5 \times 10^{-5}$ mol of vanadium-(IV) chloride. After an activator had been added, the reaction mixture was irradiated with a 200 Watt electric lamp for 3 minutes and after 30 minutes, the reaction was stopped by the addition of ethanol at a conversion of 74%. The following compounds were used as activators.
  a. 0.28 g of potassium carbonate in heptane suspension;
  b. 0.30 g of magnesium carbonate in heptane suspension;
  c. 0.25 g of ferrous carbonate in heptane solution;
  d. 0.26 g of zinc carbonate in heptane suspension.

A rubber-like polymer was formed in all of the cases, which was of a similar character and properties to that obtained in EXAMPLE 31.

What is claimed is:

1. A method for the polymerization of isobutylene, which comprises subjecting to a source of light selected from the group consisting of ultraviolet light, visible light, and infrared light at a temperature between about 0° C. and about −140° C. an isobutylene feed selected from the group consisting of (a) essentially isobutylene and (b) essentially a mixture of isobutylene and butadiene and/or isoprene in the presence of at least one halide catalyst selected from the group consisting of tetravalent vanadium, titanium and zirconium halides and in the presence of at least one activator for said halide catalyst selected from the group consisting of magnesium aluminate, magnesium carbonate, and magnesium silicate, the molar ratio of said halide catalyst to said activator ranging from $10^3$ to $10^3$ part of halide catalyst to 1 part of activator.

2. A method according to claim 1, in which the polymerizable mixture consists essentially of isobutylene.

3. A method according to claim 1, in which the polymerizable mixture consists essentially of isobutylene and butadiene.

4. The method according to claim 1 in which the polymerizable mixture consists essentially of isobutylene and isoprene.

5. The method according to claim 1 in which the polymerizable mixture consists essentially of isobutylene, butadiene and isoprene.

6. A method for the polymerization of isobutylene, which comprises subjecting to a source of light selected from the group consisting of ultraviolet light, visible light, and infrared light at a temperature between about 0° C. and about −140° C. an isobutylene feed selected from the group consisting of (a) essentially isobutylene and (b) essentially a mixture of isobutylene and butadiene and/or isoprene in the presence of at least one halide catalyst selected from the group consisting of tetravalent vanadium, titanium and zirconium halides and in the presence of at least one activator for said halide catalyst selected from the group consisting of potassium carbonate, ferrous carbonate, and zinc carbonate, the molar ratio of said halide catalyst to said activator ranging from $10^3$ to $10^{-3}$ part of halide catalyst to 1 part of activator.

7. A method according to claim 6, in which the polymerizable mixture consists essentially of isobutylene.

8. A method according to claim 6, in which the polymerizable mixture consists essentially of isobutylene and butadiene.

9. A method according to claim 6, in which the polymerizable mixture consists essentially of isobutylene and isoprene.

10. A method according to claim 6 in which the polymerizable mixture consists essentially of isobutylene, butadiene and isoprene.

* * * * *